United States Patent

[11] 3,556,159

[72] Inventor William J. Bleasdale
P.O. Box 15012, South Gate, Sarasota, Fla. 33579
[21] Appl. No. 822,133
[22] Filed May 6, 1969
[45] Patented Jan. 19, 1971

[54] SURGE CUSHIONING APPARATUS FOR PRESSURE SYSTEMS
8 Claims, 6 Drawing Figs.

[52] U.S. Cl. .................................................. 138/30
[51] Int. Cl. .................................................. F16l 55/04
[50] Field of Search ...................................... 138/30, 26

[56] References Cited
UNITED STATES PATENTS

| | | | |
|---|---|---|---|
| 2,185,023 | 12/1939 | Crane | 138/30 |
| 2,341,556 | 2/1944 | Joy | 138/30 |
| 2,583,231 | 1/1952 | Ragland | 138/30 |
| 2,861,595 | 11/1958 | Pier | 138/30 |
| 2,878,835 | 3/1959 | Peterson | 138/30 |
| 2,918,090 | 12/1959 | Shelly | 138/30 |

FOREIGN PATENTS

| | | | |
|---|---|---|---|
| 1,109,900 | 4/1968 | Great Britain | 138/26 |

Primary Examiner—Herbert F. Ross
Attorney—Oldham and Oldham

ABSTRACT: This apparatus includes a container means connectable to the liquid source or system to receive pressure liquid therefrom, and a continuous flexible diaphragm secured to the container means in sealed engagement therewith to form a chamber sealed from the liquid system, which diaphragm has spaced areas of different resilient strengths.

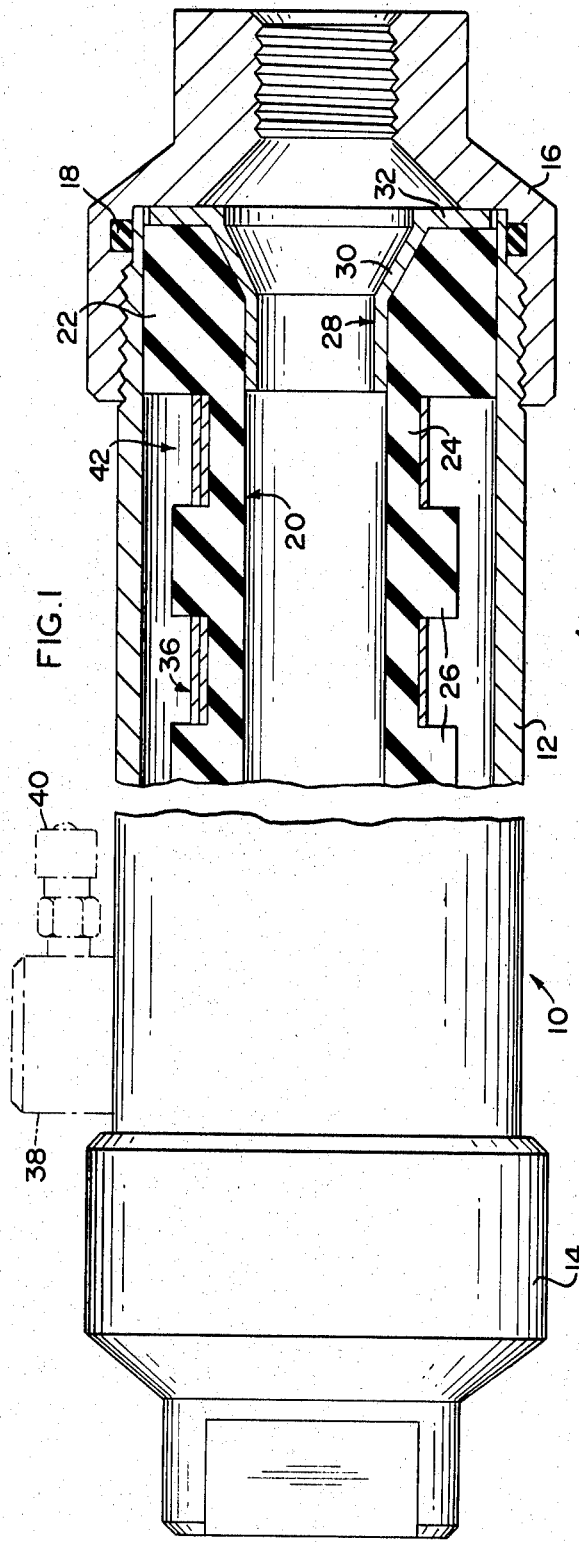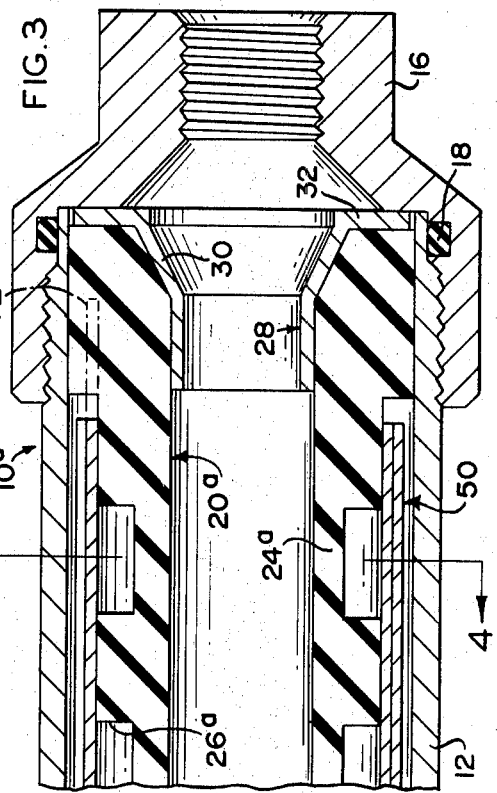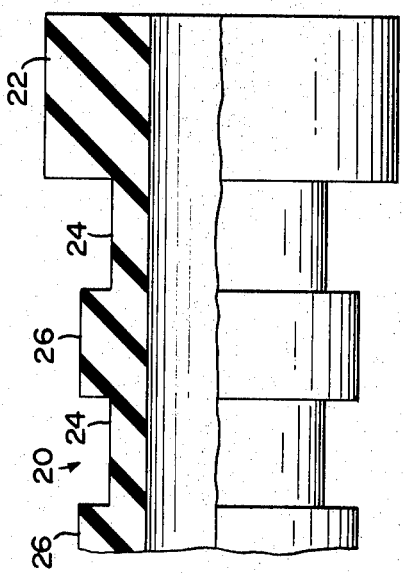

SURGE CUSHIONING APPARATUS FOR PRESSURE SYSTEMS

The present invention relates to surge cushioning apparatus, and especially to improved apparatus for connection to pressure systems for cushioning or dampening pressure surges in variations and impacts occuring therein.

Heretofore there have been many different types of cushioning apparatus provided for pressure systems and prior art of this general type is evidenced by my own prior U.S. Pat. Nos. 3,276,477, 3,276,478 and 3,380,480.

Most of the primary efforts in this field have been devoted to surge cushioning systems for relatively high pressure systems but the need exists in the art for a relatively uncomplicated, versatile, relatively inexpensive surge cushioning apparatus for low pressure systems, or systems where less sophisticated equipment is desired.

Accordingly, it is the general object of the present invention to provide a novel and improved surge cushioning apparatus particularly adapted for use in low pressure systems and including an elastic or flexible diaphragm therein having areas of different thicknesses for varied resistance to deflection by pressure change.

Another object of the invention is to use an improved type of a tubular elastic diaphragm in pressure surge apparatus and wherein such diaphragm has axially spaced areas of different radial thicknesses and strengths therein and wherein the weaker portions of the tubular diaphragm can be reenforced, if desired, with elastic spring means.

Another object of the invention is to provide a novel and improved, relatively inexpensive surge cushioning apparatus which is relatively uncomplicated and which is inexpensive to build and assemble, which apparatus is adapted to be used with or without auxiliary pressure sources in a multicompartment type of a surge suppressor apparatus.

Other objects of the invention are to provide surge dampening or cushioning apparatus involving a tubular elastic diaphragm therein and wherein such diaphragm may be reenforced on its inner periphery by a resilient spring member; where an elastic tubular diaphragm can have axially spaced areas of different thicknesses therein; where elastic springs means can be used for reenforcing localized areas of the outer periphery of the tubular sleeve, if desired; where an elastic tubular sleeve can be reenforced by special longitudinally extending metal springs; and where varied rates of expansion are provided in different portions of a confining member.

The foregoing and other objects and advantages of the invention will be made more apparent as the specification proceeds.

Reference now is made to the accompanying drawings, wherein:

FIG. 1 is a broken away elevation, partially shown in vertical section, of a surge dampening apparatus embodying the principles of the present invention;

FIG. 2 is a fragmentary elevation of a tubular elastic diaphragm as used in the apparatus of FIG. 1 with a portion of the diaphragm being broken away and shown in vertical section;

FIG. 3 is a fragmentary vertical section of an end portion of a modified surge dampening apparatus of the invention;

When referring to corresponding members shown in the drawings and referred to in the specification, corresponding numerals are used to facilitate comparison therebetween.

Figure 4:
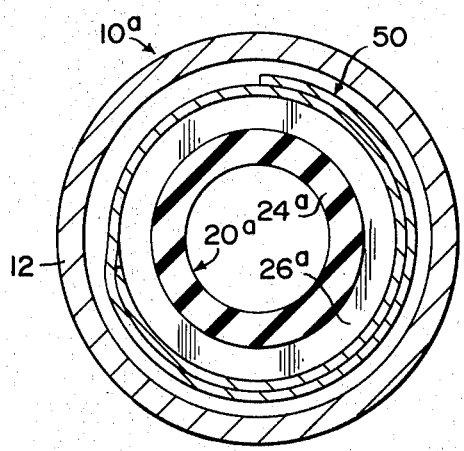
FIG. 4 is a vertical section taken on line 4—4 of FIG. 3.

The present apparatus, generally speaking, relates to a means or apparatus for use with a liquid pressure system for pressure surge dampening and/or cushioning action and which comprises a container means connectable to the liquid system to receive pressure liquid therefrom, and a continuous flexible diaphragm, usually tubular, secured to the container means in sealed engagement therewith to form a variable size chamber sealed from the liquid system, which diaphragm has spaced areas therein of different thicknesses and expansion characteristics, the diaphragm having liquid pressure exerted thereon.

With reference to the details of the structure shown in the drawings, a surge cushioning apparatus of the invention is indicated as a whole by the numeral 10. It includes a suitable outer enclosure, usually tubular, and indicated by the numeral 12 and which has, in the embodiment shown, a pair of end connectors or coupling means 14 and 16 secured thereto by threaded joints, as shown. Usually a member, such as an O-ring 18 is operatively positioned between a portion of the outer enclosure or sleeve 12 and adjacent walls of the end connectors 14 and 16 whereby a good effective sealed engagement is provided therebetween. The end connectors 14 and 16 thus are used to connect the surge cushioning apparatus to any desired hydraulic pressure system wherein surges or pressure shocks are set up by apparatus operation and wherein the surge cushioning apparatus 10 of the invention is provided to cushion, dampen and/or absorb such pressure shocks and avoid severe stresses in the hydraulic pressure system.

An inner elastic diaphragm member 20, usually tubular, is operably positioned within the outer sleeve 12 and its bore connects operatively to the end connectors 14 and 16 for receipt of pressure fluid therefrom. This resilient sleeve 20 preferably has end portions 22 of a relatively thick radial length and and axially spaced sections 24 of minimum radial thickness, which thinner sections 24 are axially spaced from each other by reenforcing sections 26 usually of a radial thickness intermediate that of the thinner sections 24 and the relatively heavy reenforced end portions or sections 22.

FIG. 2 shows the unstressed positioning and shape of the resilient sleeve 22, but in assembly thereof into the surge cushioning apparatus 10, an end sleeve or sealing member 28 is operatively engaged with each end of the resilient sleeve 20. This metallic end sleeve 28 is provided with a conical section 30 that terminates at its axially outer end in a radially directed flange 32. As indicated in the drawings, the axially inner tubular end of this metal end sleeve 28 engages with the bore in the resilient sleeve 20 in its normal relaxed condition, and the conical section 30 must be forced axially into engagement with the end portion 22 of the resilient sleeve to expand it radially outwardly and aid in sealing the resilient sleeve 20 into operable engagement with the end connectors provided. FIG. 1 of the drawings clearly shows that a shoulder on the end connector 16 engages with a radially outer portion of the flange 32 and forces such end sleeve 28 axially inwardly of the resilient sleeve 20 to displace some of the elastic material forming the resilient sleeve 20 and compress the end portion 22 between adjacent portions of the end sleeve 28 and the axially outer end of the metal outer sleeve 12. Hence, just the normal assembly operation of the end connector 14 or 16 onto the metal outer sleeve 12 will prove a tight, sealed connection of the resilient sleeve 20 to such outer sleeve 12.

To aid in providing surge cushioning action in the apparatus shown and described, in some instances each of the thinner sections 24 of the resilient sleeve 20 is provided with a spring encompassing means such as the flat band leaf spring 36 that is shown engaged with the recesses provided in the periphery of the resilient sleeve. Normally, the springs 36 have approximately 1½ convolutions provided therein and they are of such size and strength that they can accommodate expansion action by the pressure conditions under which the surge cushioning apparatus 10 of the invention will normally encounter in use. In other words, the reenforcing spring action is provided for localized axially spaced areas of the resilient sleeve 20 to aid in providing smooth but rapid pressure cushioning action required in hydraulic pressure systems and which action will be provided by the improved surge cushioning apparatus disclosed.

Obviously, the resilient sleeve 20 can be made from any conventional materials, and usually they are made from elastomeric materials, such as natural and synthetic rubbers or similar materials, which are cured to the size and shapes as indicated and wherein the finished product will have inherent resilience but yet will be quite strong and tough and be adapted to stand numerous expansions and contractions without damage or rupture in any way.

It will be noted that a separate air tight compartment is formed between the outer periphery of the resilient sleeve 20 and the inner wall of the outer sleeve 12. Hence, on pressure surges, the sleeve 20 will expand and the rings or areas 26 may bottom on the pipe or sleeve 12. The rings or areas 24 would still be free to expand, as required. However, in some instances, it may be desired to inflate such chamber to a predetermined pressure by an external source of gas or air supply so that a substantially conventional fitting 38 is shown engaged with the outer sleeve 12 and it has a valve unit 40 of any conventional design associated therewith to facilitate supply of compressed air or other gas to the fitting 38 for flow into the compartment 42 formed between the sleeves 12 and 20, respectively.

FIG. 3 shows a slight modification of the invention wherein a surge cushioning apparatus 10a is shown that has a resilient sleeve 20a positioned therein in the same manner as described hereinbefore. However, in this instance, a metallic outer spring metal sleeve 50 is provided in resilient supporting engagement with outer periphery of the axially spaced reenforcing sections 26a of this resilient sleeve 20a. Again, approximately 1½ convolutions are provided in this tubular elastic spring or sleeve 50 which is provided to obtain an improved, different reenforcing action for the resilient sleeve 20a to aid it in cushioning severe fluid pressure impacts and shocks transmitted thereto.

Figure 5:
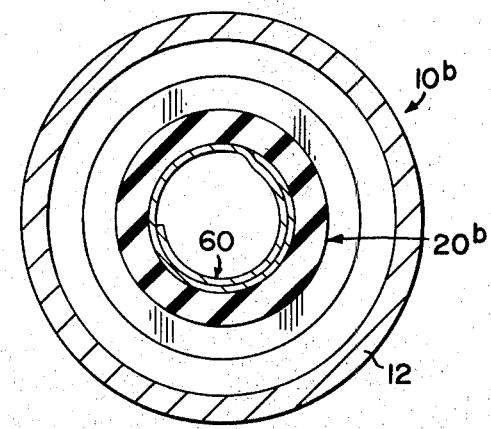
FIG. 5 is a vertical section through a modified type of a surge dampening apparatus of the invention and taken on a portion corresponding to that of FIG. 4 of the surge dampening apparatus.

FIG. 5 shows a further embodiment of the invention indicated as a surge cushioning apparatus 10b. In this instance, a tubular resilient sleeve 20b has a helically wound or resilient reenforcing spring-sleeve 60 frictionally positioned within the bore of the resilient sleeve 20b to provide a free floating sleeve. Such sleeve will extend substantially the same length as the outer sleeve 50 shown in FIG. 3, but which in this instance is supported within the bore of the tubular sleeve to provide an improved cushioning action in the accumulator or surge cushioning apparatus of the invention.

Figure 6:
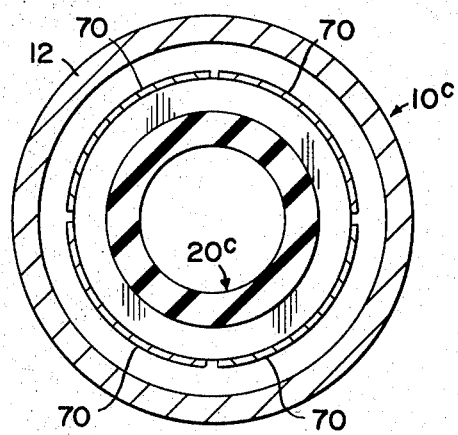
FIG. 6 is another vertical section, like FIG. 4, but of a further modification of the surge dampening apparatus of the invention.

FIG. 6 shows a vertical section of yet a further modified surge cushioning apparatus 10c of the invention. In this instance, a plurality of longitudinally extending arcuate spring leafs, or members 70 are provided in slightly circumferentially spaced relationship on the outer periphery of the resilient sleeve 20c provided in this embodiment of the invention. Such resilient springs 70 can be secured in position as indicated at 72 in FIG. 3 of the drawings. Thus, the resilient spring leaves 70 would be of greater axial length than the helically wound spring 50 and would extend in between the axially outer end of the metal sleeve 12 and the associated end sleeve 28 or equivalent means received within the bore of the resilient sleeve in this embodiment of the invention. Any suitable recesses or slots can be provided in the end portions of this resilient sleeve 20c in the embodiment of the invention shown in FIG. 6 to receive the ends of the spring leaves.

It will be realized that all modifications of the invention utilize an expansion member similar to the sleeve 20 and similar positioning means to that shown in FIG. 1.

It will be noted that the tubular sleeves 20 and the like have cylindrical peripheries and flat bottomed grooves therein. The grooves can receive a flat spring reenforcing means therein or spring members may extend axially of the resilient sleeve for reenforcing action. Special end sealing members are also provided to aid in sealing the resilient sleeves in the apparatus.

The apparatus of the invention is particularly adapted to operate with relatively low pressure hydraulic systems or in systems requiring low cost maintenance free surge cushioning means. The system uses a resilient means with different expansion characteristics in different areas thereof in sealed engagement with a portion of the frame or confining means in the surge cushioning apparatus so that in the apparatus shown, a tubular resilient sleeve 20 is sealed in engagement with an outer sleeve 12 but other sealed chambers can be provided and wherein the resilient member in the unit has axially or radially spaced portions of different strengths provided therein. Naturally, if desired, an end cap can be used to replace one of the end connectors 14 and 16 whereby the fluid being processed does not need to flow into and through the surge cushioning apparatus. By avoiding the use of any inflating pressure in the chambers formed between the outer sealing member and the resilient inner sleeve or means, a surge cushioning apparatus has been provided that is relatively inexpensive and uncomplicated and one which will provide a lengthy service life with a minimum of maintenance thereon. Hence, it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

I claim:

1. Means for use with a liquid pressure system for pressure surge dampening and/or cushioning action with the system and comprising:
   a container means connectable to the liquid system to receive pressure liquid therefrom; and
   an elastic diaphragm of unitary structure secured to said container means in sealed engagement therewith to form a chamber within said container means sealed from the liquid system, said diaphragm having axially spaced alternating thick and thin wall portions of different expansion characteristics.

2. Means for use with liquid pressure systems as in claim 1 where said diaphragm is tubular, has axially spaced grooves therein, and has end portions of greater radial length than other portions of said diaphragm.

3. Means for use with liquid pressure systems as in claim 2 where said diaphragm has a cylindrical outer contour, and a tubular air tight chamber is formed between said container means and said tubular diaphragm.

4. Means for use with liquid pressure systems as in claim 2 where said axially spaced grooves have flat bottoms, and a coiled flat strip spring means is positioned in at least a plurality of said grooves to reenforce the same against expansion.

5. Apparatus for use with a liquid pressure system for pressure surge dampening and/or cushioning action with the system and comprising:
   a container means connectable to the liquid system to receive pressure fluid there from and including a sleeve and end connectors thereon;
   an elastic tubular diaphragm of unitary structure diaphragm secured to said container means in sealed engagement therewith to form a chamber within said container means sealed from the liquid system, said diaphragm having enlarged cylindrically shaped ends and axially spaced annular grooves to provide different expansion characteristics in the periphery thereof; and
   tubular end support means for said diaphragm positioned in said container means within said diaphragm at each end thereof, said support means each having an end flange thereon and a conical section connecting to said end flange and converging in an axially inward direction therefrom, said end connectors engaging said end flange and forcing end portions of said diaphragm into sealed engagement with said sleeve by said conical section engaging the bore of said tubular diaphragm.

6. Apparatus for use with a liquid pressure system according to claim 5 which includes means to restrict expansion of said tubular diaphragm, said tubular diaphragm having a cylindrical periphery interrupted by axially spaced grooves, said means comprising a spring sleeve means engaging said cylindrical periphery of said tubular diaphragm.

7. Apparatus for use with a liquid pressure system as in claim 6 and wherein said spring sleeve means comprises longitudinally extending arcuate in section spring members positioned in circumferentially spaced relation to each other.

8. Apparatus for use with a liquid pressure system as in claim 5 and including:
   means for supply of a pressure fluid to said chamber; and
   a helically coiled tubular spring means positioned within the bore of said tubular diaphragm and engaging the wall thereof to reenforce the same.

UNITED STATES PATENT OFFICE
CERTIFICATE OF CORRECTION

Patent No. 3,556,159   Dated January 19, 1971

Inventor(s) William J. Bleasdale

It is certified that error appears in the above-identified patent and that said Letters Patent are hereby corrected as shown below:

Claim 4, line 56, after "structure" - delete "diaphragm"

Signed and sealed this 25th day of May 1971.

(SEAL)
Attest:

EDWARD M. FLETCHER, JR.
Attesting Officer

WILLIAM E. SCHUYLER, JR.
Commissioner of Patents